(12) United States Patent
May

(10) Patent No.: US 10,167,994 B2
(45) Date of Patent: Jan. 1, 2019

(54) INSTRUMENT AND SPEAKER LIFT STAND

(71) Applicant: Randall May International Incorporated, Irvine, CA (US)

(72) Inventor: Randall L. May, Irvine, CA (US)

(73) Assignee: Randall May International Incorporated, Irvine, CA (US)

( * ) Notice: Subject to any disclaimer, the term of this patent is extended or adjusted under 35 U.S.C. 154(b) by 0 days.

(21) Appl. No.: 15/826,547

(22) Filed: Nov. 29, 2017

(65) Prior Publication Data

US 2018/0080600 A1 Mar. 22, 2018

Related U.S. Application Data

(63) Continuation of application No. 14/497,923, filed on Sep. 26, 2014, now Pat. No. 9,863,573.

(60) Provisional application No. 61/882,958, filed on Sep. 26, 2013.

(51) Int. Cl.
*F16M 11/00* (2006.01)
*F16M 11/28* (2006.01)
*F16B 7/10* (2006.01)
*F16M 11/04* (2006.01)
*F16M 11/24* (2006.01)
*G10D 7/10* (2006.01)
*G10D 13/02* (2006.01)
*G10G 5/00* (2006.01)
*G10G 1/04* (2006.01)
*F16B 2/10* (2006.01)
*F16B 7/14* (2006.01)
*F16B 35/00* (2006.01)

(52) U.S. Cl.
CPC ............... *F16M 11/28* (2013.01); *F16B 7/10* (2013.01); *F16M 11/04* (2013.01); *F16M 11/242* (2013.01); *F16M 11/245* (2013.01); *G10D 7/10* (2013.01); *G10D 13/026* (2013.01); *G10G 1/04* (2013.01); *G10G 5/00* (2013.01); *G10G 5/005* (2013.01); *F16B 2/10* (2013.01); *F16B 7/1418* (2013.01); *F16B 7/1454* (2013.01); *F16B 35/005* (2013.01); *F16M 2200/047* (2013.01)

(58) Field of Classification Search
None
See application file for complete search history.

(56) References Cited

U.S. PATENT DOCUMENTS

| | | | |
|---|---|---|---|
| 1,570,168 A | 1/1926 | Mortensen | |
| 1,646,165 A | 10/1927 | Naujoks et al. | |
| 1,653,772 A | 12/1927 | Knoche | |
| 2,575,540 A | 11/1951 | Wenger | |
| 3,024,690 A | 3/1962 | Sanstead | |
| 3,193,325 A | 7/1965 | Wenger | |
| 3,259,428 A | 7/1966 | Wenger et al. | |
| 3,811,357 A | 5/1974 | Stewart | |
| 3,960,311 A | 6/1976 | Griffiths | |
| 4,065,994 A | 1/1978 | Streit | |
| 4,067,527 A | 1/1978 | Streit | |
| 4,405,107 A * | 9/1983 | Clyburn | F16B 7/1418 248/230.4 |

(Continued)

*Primary Examiner* — Monica E Millner
(74) *Attorney, Agent, or Firm* — Crowell & Moring LLP

(57) ABSTRACT

A musical instrument stand has an expandable telescoping stand with an adjustable travel stop included interior to an extension tube diameter. The telescopic extension of the musical instrument stand is adjustable by repositioning the travel stop longitudinally within the tube.

9 Claims, 9 Drawing Sheets

(56) References Cited

U.S. PATENT DOCUMENTS

| | | | | |
|---|---|---|---|---|
| 4,430,017 A * | 2/1984 | Stefancich | | F16B 7/1454 |
| | | | | 248/295.11 |
| 4,488,469 A * | 12/1984 | Demello | | G10G 5/00 |
| | | | | 248/201 |
| 4,493,344 A | 1/1985 | Mathison et al. | | |
| 4,744,690 A * | 5/1988 | Hsieh | | F16B 7/1418 |
| | | | | 248/411 |
| 5,072,910 A | 12/1991 | May | | |
| 5,202,527 A * | 4/1993 | Gracie | | F16M 11/28 |
| | | | | 84/327 |
| 5,335,575 A * | 8/1994 | Hoshino | | F16M 11/10 |
| | | | | 248/436 |
| 5,564,661 A * | 10/1996 | Gershon | | A47B 19/002 |
| | | | | 248/167 |
| 5,789,687 A | 8/1998 | Johnson | | |
| 5,794,899 A * | 8/1998 | Tamllos | | F41A 23/12 |
| | | | | 248/166 |
| 5,827,108 A | 10/1998 | Spector | | |
| 5,927,670 A * | 7/1999 | Hsieh | | F16M 11/28 |
| | | | | 248/405 |
| 6,316,706 B1 * | 11/2001 | Sammons | | A47B 19/002 |
| | | | | 84/327 |
| 6,454,483 B1 * | 9/2002 | Hoshino | | F16B 7/0413 |
| | | | | 248/188.5 |
| 6,585,199 B1 * | 7/2003 | Yu | | F16M 11/28 |
| | | | | 248/163.1 |
| 6,588,716 B1 * | 7/2003 | Heid | | A47B 19/002 |
| | | | | 248/125.8 |
| 6,695,268 B1 * | 2/2004 | Hsieh | | A47B 19/002 |
| | | | | 248/188.7 |
| 6,698,698 B1 * | 3/2004 | Hsieh | | F16B 7/105 |
| | | | | 248/125.8 |
| 6,719,257 B1 * | 4/2004 | Greene | | F16B 7/1418 |
| | | | | 248/161 |
| 7,438,266 B2 | 10/2008 | May | | |
| 7,473,833 B2 * | 1/2009 | Holtfreter | | G10D 7/10 |
| | | | | 84/387 A |
| 7,575,209 B1 | 8/2009 | Wiese | | |
| 7,588,288 B2 | 9/2009 | May | | |
| 7,703,725 B2 | 4/2010 | May | | |
| 7,718,878 B2 | 5/2010 | May | | |
| 7,928,304 B2 * | 4/2011 | Eason | | F16B 7/0486 |
| | | | | 84/412 |
| 8,016,253 B1 * | 9/2011 | Yu | | F16M 11/28 |
| | | | | 248/161 |
| 8,550,027 B2 * | 10/2013 | May | | G09F 17/00 |
| | | | | 116/173 |
| 8,662,461 B2 * | 3/2014 | Mori | | F16B 2/10 |
| | | | | 248/229.13 |
| 2003/0173484 A1 * | 9/2003 | Hsieh | | F16M 11/28 |
| | | | | 248/291.1 |
| 2005/0011337 A1 * | 1/2005 | Hsieh | | F16M 11/041 |
| | | | | 84/327 |
| 2005/0016354 A1 * | 1/2005 | Kent | | G10G 5/00 |
| | | | | 84/327 |
| 2005/0092878 A1 * | 5/2005 | Murray | | F16M 11/041 |
| | | | | 248/171 |
| 2006/0049319 A1 * | 3/2006 | L. May | | G10D 13/026 |
| | | | | 248/166 |
| 2006/0096444 A1 * | 5/2006 | Sato | | F16M 11/10 |
| | | | | 84/422.3 |
| 2007/0012160 A1 * | 1/2007 | Sato | | G10D 13/026 |
| | | | | 84/421 |
| 2007/0080268 A1 * | 4/2007 | Worrell | | E04F 21/06 |
| | | | | 248/177.1 |
| 2007/0145202 A1 * | 6/2007 | Hsieh | | F16B 7/1427 |
| | | | | 248/161 |
| 2007/0200036 A1 * | 8/2007 | Hsieh | | F16M 11/28 |
| | | | | 248/122.1 |
| 2008/0061195 A1 * | 3/2008 | Carnevali | | F16M 11/14 |
| | | | | 248/125.8 |
| 2009/0007754 A1 * | 1/2009 | May | | F16M 11/34 |
| | | | | 84/421 |
| 2009/0184074 A1 | 7/2009 | Jacobson | | |
| 2010/0152002 A1 | 6/2010 | Knight | | |
| 2011/0197803 A1 * | 8/2011 | May | | G09F 17/00 |
| | | | | 116/173 |
| 2012/0144974 A1 * | 6/2012 | May | | G10D 13/026 |
| | | | | 84/387 A |
| 2013/0042745 A1 * | 2/2013 | Shimada | | F16M 11/245 |
| | | | | 84/421 |

\* cited by examiner

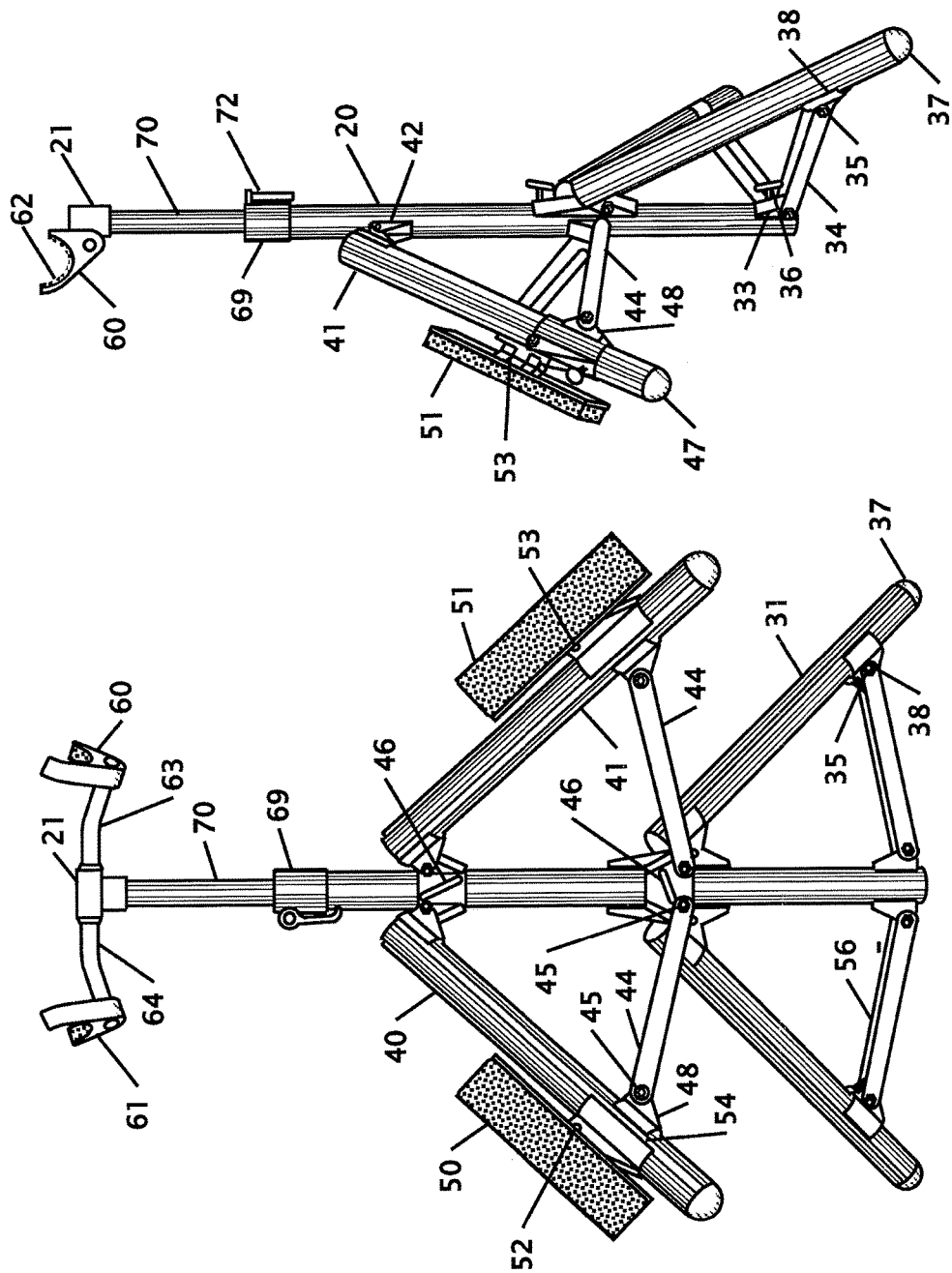

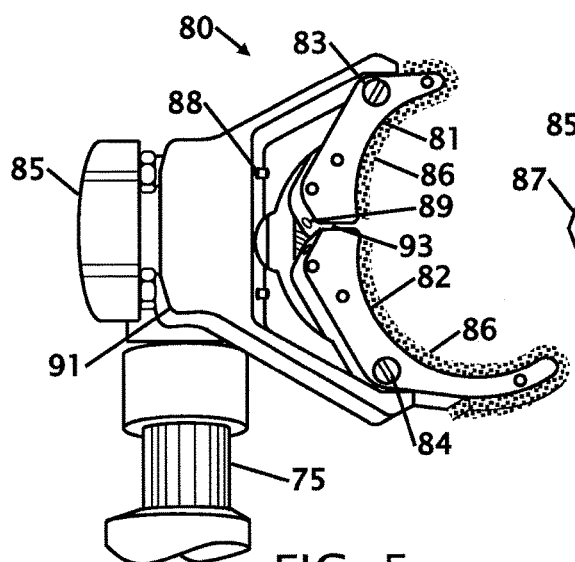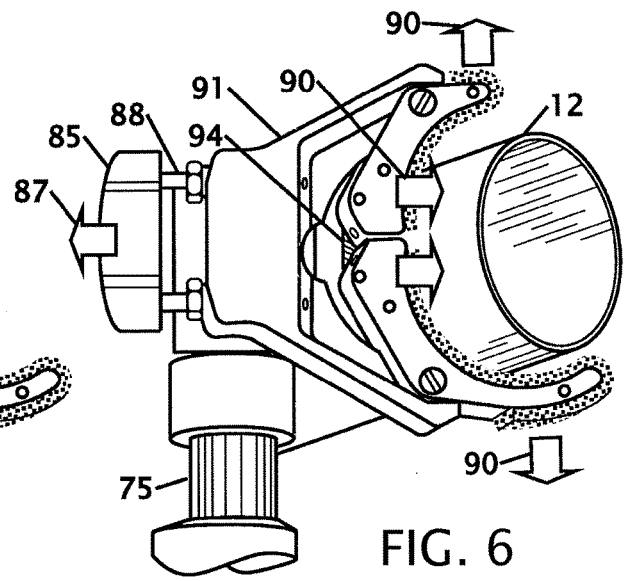
FIG. 5
FIG. 6
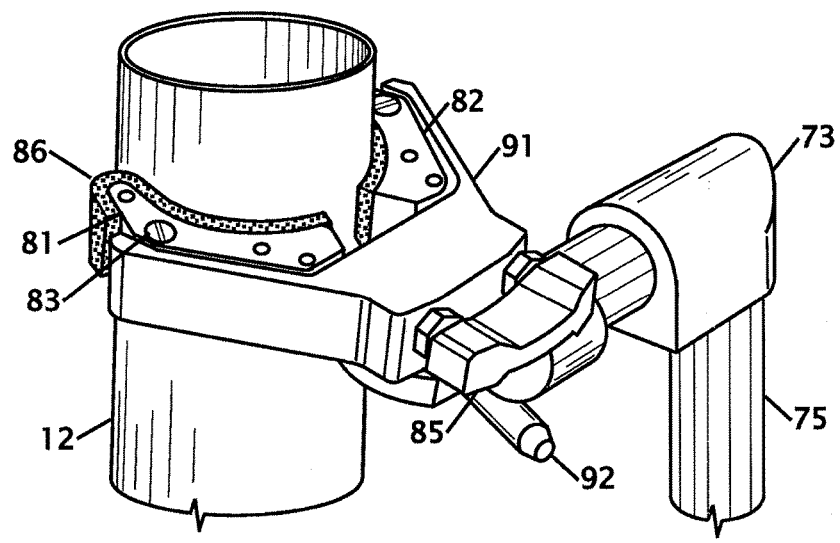
FIG. 7

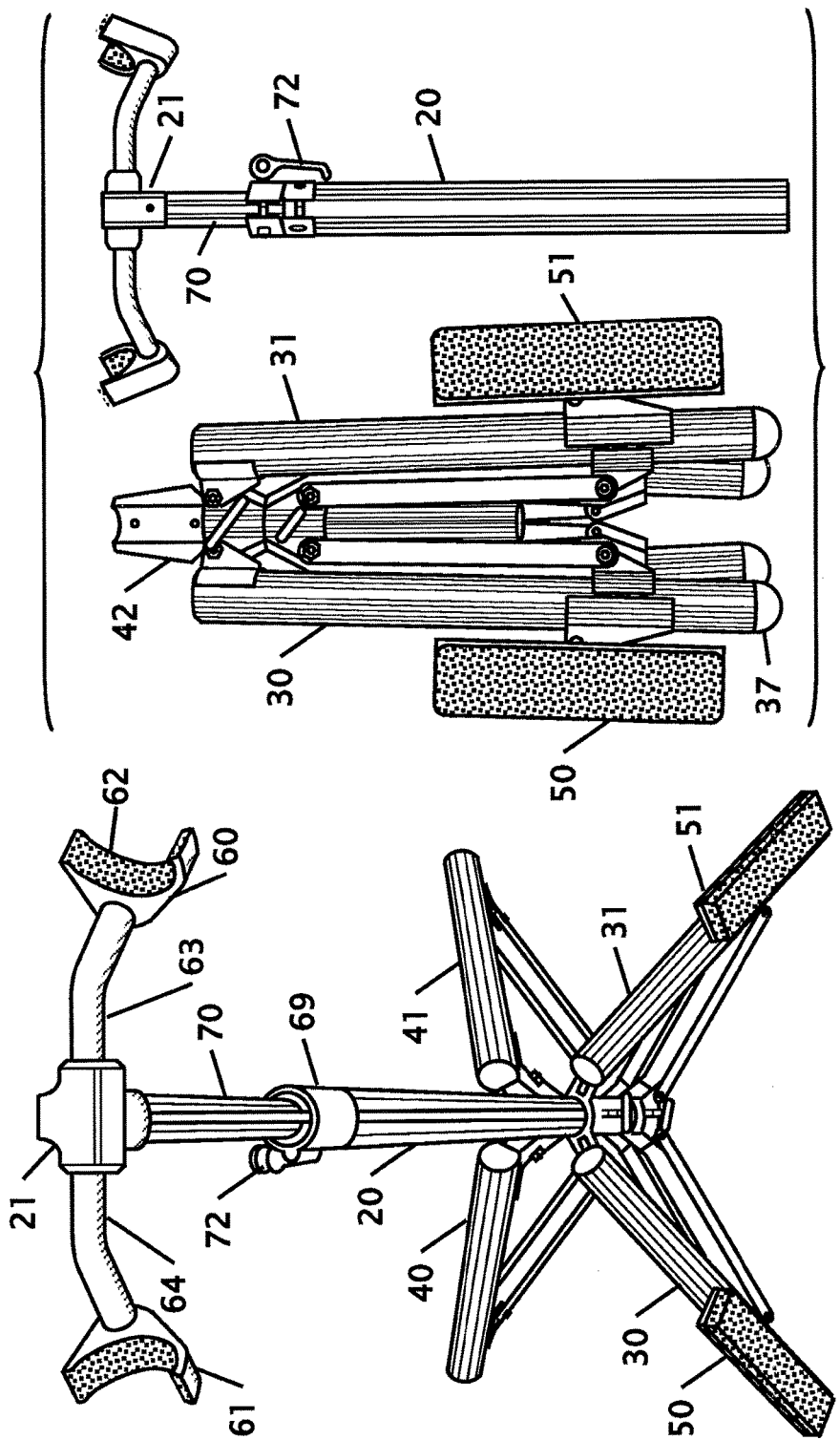

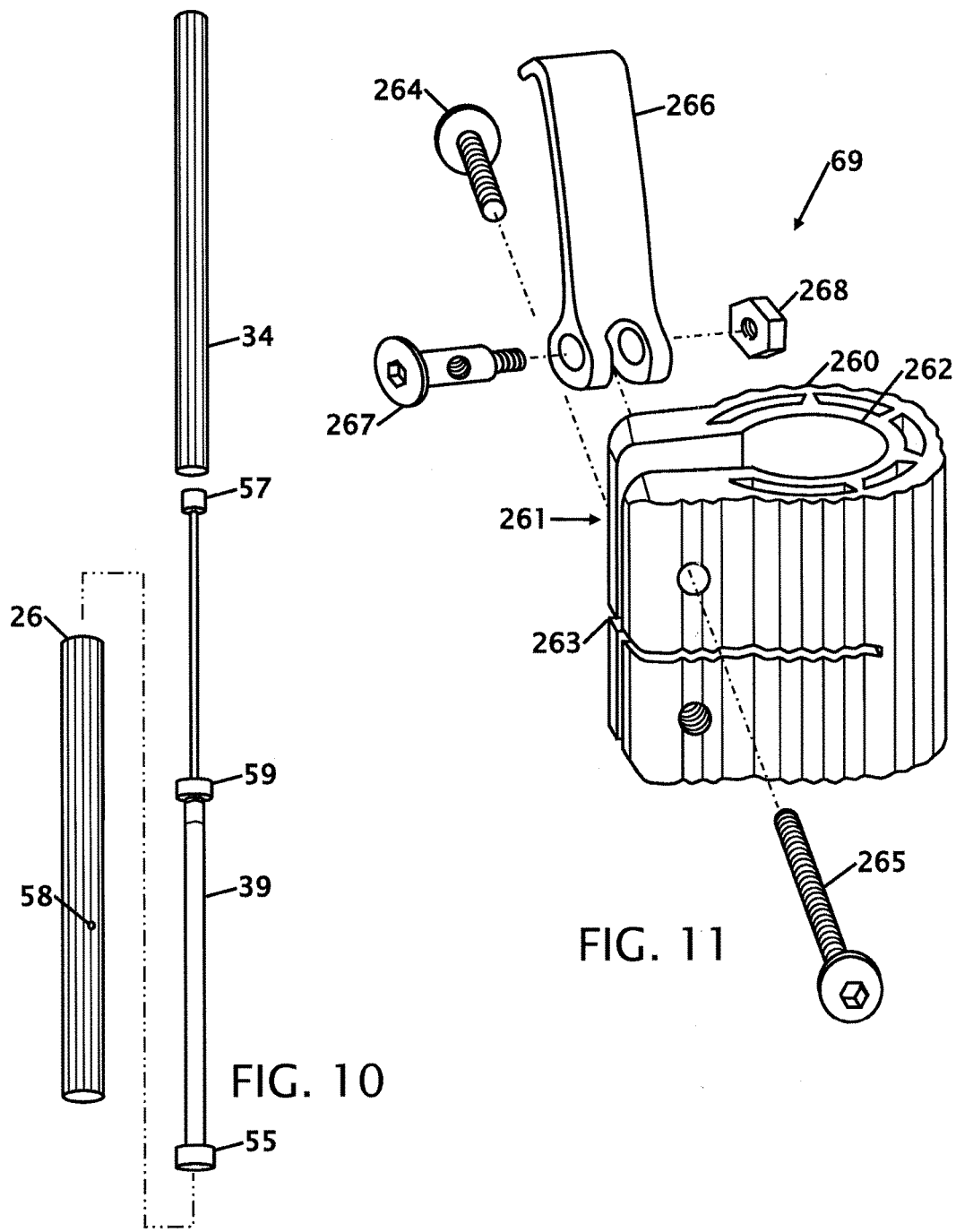

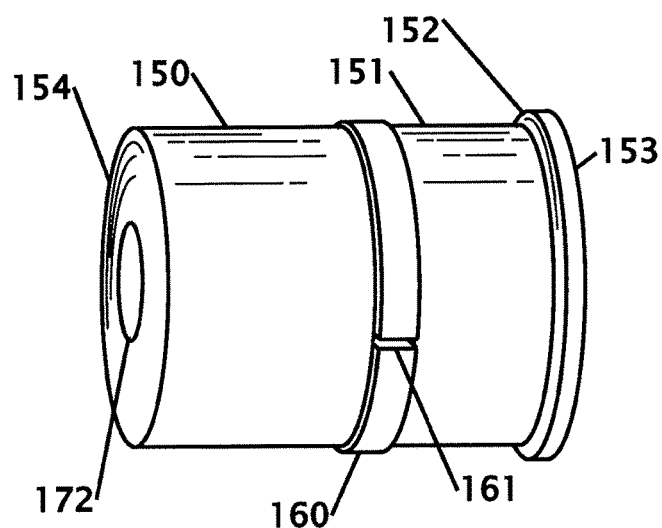
FIG. 12
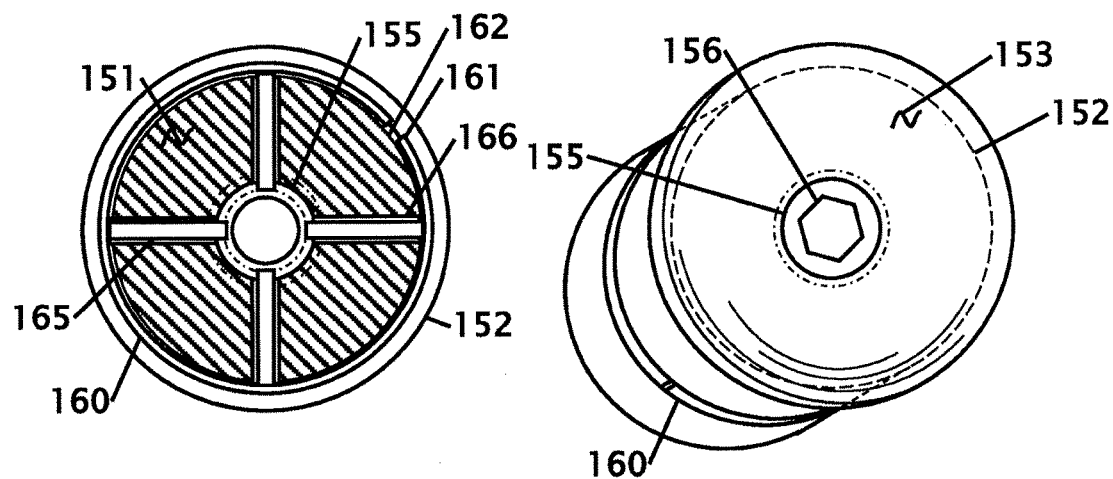
FIG. 13
FIG. 14

INSTRUMENT AND SPEAKER LIFT STAND

CROSS REFERENCE TO RELATED APPLICATION

This application is a continuation of prior U.S. application Ser. No. 14/497,923, filed Sep. 26, 2014 which claims priority to Provisional Application Ser. No. 61/882,958 filed on Sep. 26, 2013 the entire contents of which is hereby expressly incorporated by reference herein.

BACKGROUND OF THE INVENTION

This invention relates to improvements in an instrument and speaker lift stand for a musical instruments and sound speakers with an adjustable stop within the stand to limit travel. More particularly, the present musical instrument stand is a collapsible musical instrument stand that rigidly supports a sousaphone and other brass type instruments in an in a stored and in a playable position. The lift stand also functions to elevate a speaker with the collapsible stand. The stand supports all or the majority of the weight of the instrument or speaker in a static position to relieve the performer or technician of the weight of the musical instrument or speaker.

Several products and patents have been. Exemplary examples of patents covering these products are disclosed herein. Musical instrument stands are desirable for supporting various articles and instruments since they provide selective height adjustment and a stable support. They are particularly useful is supporting such things as cameras, video equipment, telescopes, surveying instruments, and musical instruments. Musical instrument stands for brass instruments, however, raise special problems when used on steps or stairs of an auditorium or stadium.

There are several patents that describe various adjustable musical instrument stand devices. Bruneau U.S. Pat. No. 1,517,825 shows a tripod support for a table having adjustable legs.

This invention is an improvement over the inventor's, May, U.S. Pat. No. 5,072,910. The US patent office has issued several musical instrument stands to May that disclose and provide support for musical instruments namely U.S. Pat. Nos. 7,438,266, 7,588,228, 7,703,725 and 7,718,878. It is distinguished over the prior art in general, and these patents in particular by an adjustable musical instrument stand with independently adjustable legs which comprises a longitudinal extensible upright portion of telescoping tubular members, a plurality of collar members slidably mounted on the upright portion which are longitudinally adjustable relative to one another and to the upright portion for selective positioning thereon, and a plurality of movable leg members are operatively connected to upper and lower collar members for selective independent longitudinal positioning and radial extension relative to the upright portion and to one another. One leg of the musical instrument is adjustable in length, a sufficient amount, to permit support on two different stairs or steps of an auditorium or stadium.

Boehm, U.S. Pat. No. 3,570,130 discloses a holding device for surveying instruments which includes a channel-like mounting bracket with a pair of instrument gripping clamps and a pair of adjustable legs thereon which cooperate with the instrument to form a musical instrument type support for supporting the instrument in a reference position.

When the upper leg supporting collar and the corresponding lower collar are moved toward each other on the upright portion, the bottom of the leg connected thereto will be extended radially outward to be positioned an unequal distance from the center of the upright portion relative to the other legs, and the upper leg supporting collar and the corresponding lower collar are moved away from each other, the bottom of the leg connected thereto will be drawn radially inward to be positioned an unequal distance from the center of the upright portion relative to the other legs. The one adjustable leg of the musical instrument allows the stand to be erected on multi-level surfaces.

There are a number of patents that have been issued that work to plug the end of a pipe. The majority of these plugs use a metallic cone or an elastomeric washer that is squeezed to expand and fill and seal the plug within the inside diameter of the pipe. While these devices grip the inside of the pipe, they are simply a plug and the position along the interior length of the pipe is not adjustable.

Various objects, features, aspects, and advantages of the present invention will become more apparent from the following detailed description of preferred embodiments of the invention, along with the accompanying drawings in which like numerals represent like components.

BRIEF SUMMARY OF THE INVENTION

It is therefore an object of the present invention to provide an adjustable musical instrument stand that has independently adjustable movable legs.

It is another object of this invention to provide an adjustable musical instrument stand that allows for multiple angularities and musical instrument configurations.

Another object of this invention is to provide an adjustable musical instrument stand that has two or more independently adjustable movable legs providing versatility and stability in the support system.

Another object of this invention is to provide an adjustable musical instrument stand that allows for the body of the stand to be oriented in an off-axis position while maintaining the center of gravity in a stable support system.

Another object of the invention is to allow collars that support the legs, to be slidably adjusted past each other to allow for a greater variety of adjustment.

Another object of the invention is to provide an adjustable support leg positioned on the musical instrument stand and under a musical instrument to provide additional support to the musical instrument while it is being played.

Another object of the invention is to provide a spring or gas charged strut within the musical instrument stand that assists in the extension of telescoping members.

Another object of the invention is to provide additional extension legs that can be used in combination with the legs of the musical instrument stand to give greater extension capability for placement of the musical instrument stand on uneven surfaces.

Another object of the invention is for the geometry of the center tube and the legs to be essentially the same to allow for part commonality and interchangeability.

Another object of the invention is to allow the position of the leg brace to be adjustable to allow the angular arc or position of the leg to be adjusted beyond a single fixed fulcrum brace point.

It is another object of this invention is to provide an adjustable musical instrument stand for supporting articles which is simple in construction, light-weight, economical to manufacture, rugged and reliable in use.

It is another object of the present musical instrument stand to provide an expandable musical instrument stand made from extruded sections where the extruded sections include a dovetail feature that allows the extruded tubular sections to be locked together.

It is another object of this musical instrument stand to utilize dovetail locking feature s to engage tubular sections and allow the stand to become longer. The leg section creates both the leg support and the locking mechanism for the additional tubular extension.

It is another object of this musical instrument stand to allow the overall height of the instrument stand significantly reduced make the stand easier to transport and store, the long center tube support can be split into two or more pieces and assembled using an existing leg clamp to secure the two center tube sections rigidly together.

It is another object of this musical instrument stand is to provide an adjustable tripod stand that has two or more independently adjustable movable legs providing versatility and stability in the support system.

It is another object of this musical instrument stand is to provide an adjustable tripod stand that allows for the body of the stand to be oriented in a greater off-axis position while maintaining the center of gravity in a stable support system.

It is another object of the musical instrument stand is to allow collars that support the legs, to be slidably adjusted past each other to allow for a greater variety of adjustment.

It is an object of the expandable stand with an adjustable travel stop for the travel stop to be inserted and removed from the inner diameter of a tube. The ability to insert and remove the travel stop allows the extension or the travel of the lift to be adjustable by moving the travel stop within the tube. A hex key is inserted into the travel stop to lock the position, to adjust the position or to remove the travel stop. The travel stop can be used to stop the travel length and or to establish the starting point for expansion.

It is still another object of the musical instrument stand to utilize an assisted lifting mechanism, such as a spring or gas strut, to make adjusting the height of the playing surface of the musical instrument easier. The assisted lifting mechanism allows for an infinite number of heights that the instrument can be adjusted and the adjustment can be made quickly by a performer. Various lifting mechanisms can be used based upon the required force and the amount of extension that is required.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 3 shows a front perspective view of the sousaphone stand on a stadium stand supporting a sousaphone.

FIG. 4 shows a side perspective view of the sousaphone stand.

FIG. 5 shows a tubular clamp in an open configuration.

FIG. 6 shows the tubular clamp from FIG. 4 receiving a tube.

FIG. 7 shows a perspective view of the tubular clamp from FIGS. 4 and 5 grasping a tube.

FIG. 8 shows a top perspective view of the sousaphone stand.

FIG. 9 shows the collapsed pieces of the sousaphone stand ready for transportation.

FIG. 10 is an exploded view of the extension mechanism.

FIG. 11 is an exploded view of the clamping mechanism for the extension lift mechanism.

FIG. 12 shows a perspective view of the travel stop components.

FIG. 13 shows a cross sectional view of the travel stop cut just above the split ring.

FIG. 14 shows an end view of the travel stop showing the tool insert socket.

DETAILED DESCRIPTION OF THE INVENTION

Figure 1:
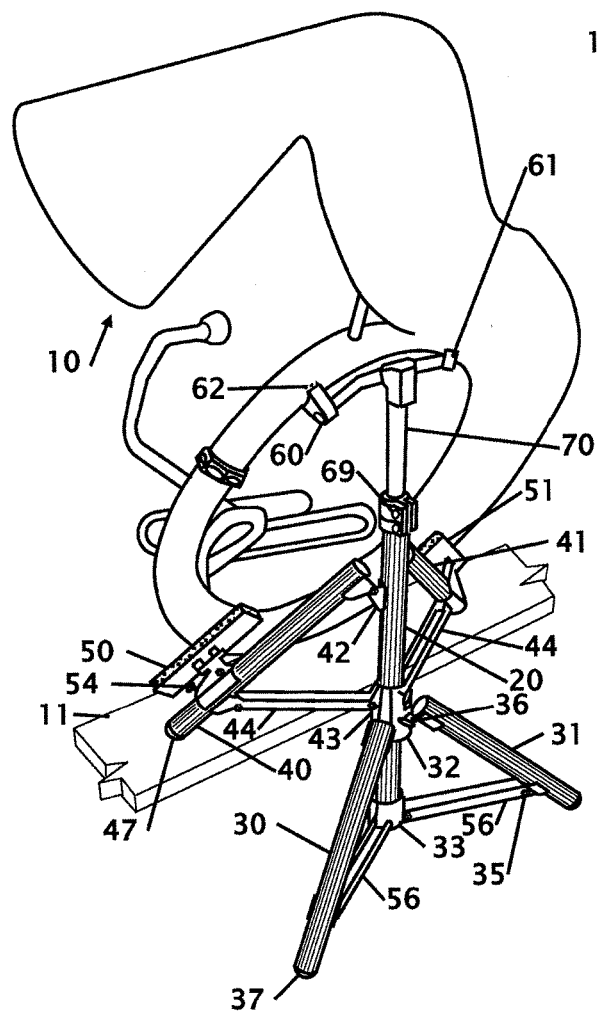
FIG. 1 shows a back isometric view of the sousaphone stand on a stadium stand supporting a sousaphone.
Figure 2:
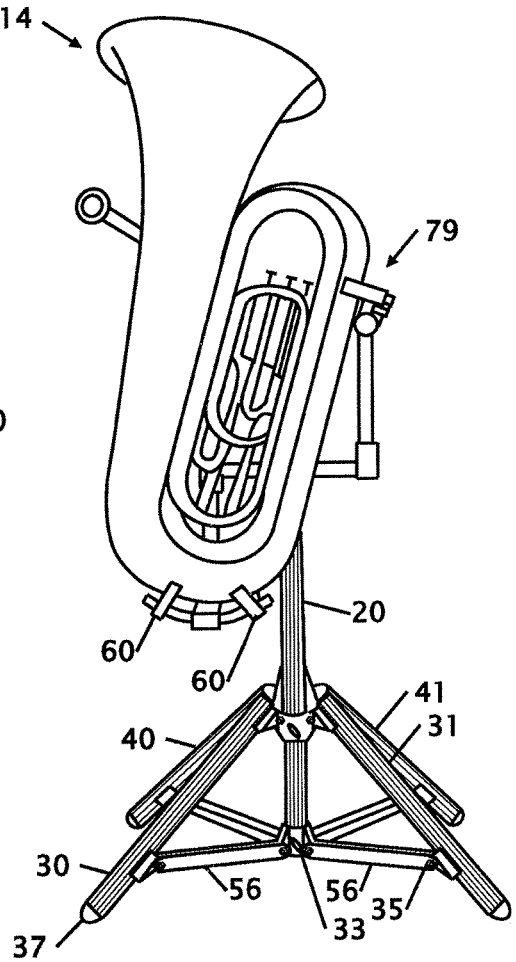
FIG. 2 shows a front perspective view of a tuba mounted in the stadium stand.

FIG. 1 shows a back isometric view of the sousaphone stand on a stadium stand supporting a sousaphone. FIG. 2 shows a front perspective view of a tuba mounted in the stadium stand. FIG. 3 shows a front perspective view of the sousaphone stand on a stadium stand supporting a sousaphone and FIG. 4 shows a side perspective view of the sousaphone stand. From FIG. 1, a sousaphone 10 is shown resting upon the stand. The stand has two sets of legs, 30, 31 and 40, 41 that are configured to slide on a central tube 20. The two sets of legs are independently connected to the central tube 20 to allow the legs to be placed on different elevations whereby allowing the first set of legs 30, 31 to be placed on the ground and the second set of legs to be placed on a bench seat 11 or similar raised platform that might be found in a stadium. While in some of the figures the legs are shown at different elevations they may also be placed on the same elevation or slightly offset in elevation to prone the stand in an off axis orientation.

The sousaphone is placed on the stand where the upper curved tube of the sousaphone 10 rests in the cradle of the arc sector or "V" receivers 60 and 61 that are covered with padding 62 to cushion the sousaphone 10. The padding can be a variety of different materials including but not limited to felt, cloth, rubbers, plastics or elastomeric. The arc padded sectors 60 and 61 are connected to a head 21 with arms 63 and 64. While arc sector or "V" receivers are shown in FIGS. 1 to 3, the head may be replaced with an elbow 73 that is connected to a single clamp as shown and described in FIGS. 4 to 5. The cantilevered weight of the sousaphone 10 naturally rotates the sousaphone 10 in the arc sector or "V" receivers 60 and 61 such that the lower portion of the sousaphone 10 rests on pads 50 and 51.

The pads 50 and 51 are pivotable on pivot pads 52 and 53 and can slide 54 on a second set of legs 40 and 41 to allow the pads 50 and 51 to be placed at a location that provides protection of the instrument. The pivoting and sliding of the pads 52 and 53 allows for player customization to accommodate placement of the pads 52 and 53.

The first set of legs 30 and 31 are slidably connected to the central tube 20 with two independent dovetail tubular first upper collar slider 32 and first lower collar slider 33. The first upper collar slider 32 is pivotably 35 connected to one end of each leg 30 and 31, while the first lower collar slider 33 is pivotably 35 connected to leg brace(s) 56 that are then slidably 38 and pivotably 35 connected to an opposing end of each leg 30 and 31. A tension screw 36 on each first upper and lower collar slider 32 and 33 secures each slider on the central tube 20. The lower end of each leg 30 and 31 has a foot pad 37 to protect the surface where the stand is placed upon.

The second set of legs 40 and 41 are slidably connected to the central tube 20 with two independent dovetail tubular second upper collar slider 42 and second lower collar slider 43. The second upper collar slider 42 is pivotably 45 connected to one end of each leg 40 and 41, while the second lower collar slider 43 is pivotably 45 connected to leg brace(s) 44 that are then slidably 48 and pivotably 45 connected to an opposing end of each leg 40 and 41. A tension screw 46 on each first upper and lower collar slider 42 and 43 secure s each slider on the central tube 20. The lower end of each leg 40 and 41 has a foot pad 47 to protect the surface where the stand is placed upon.

The collar sliders 32, 33, 38, 42, 43, and 48 are configured with reverse facing dovetail edges having a wrap angle of less than 180 degrees of wrap on the central tube and the legs 30, 31, 40 and 41 that allows the collar sliders to slide past each other on the central tube 20 and or the legs 30, 31, 40 and 41. In addition, because both the upper and lower collar sliders are independent, the angle of the leg 32, 33, 42 and 43 and or leg more brace(s) 56 and 44 are adjustable to alter the distance between the foot pads 37, 47 and the central tube 20.

The central tube 20 has an internal extension tube 70 that can be adjusted in extension to raise or lower the height of the arc sector or "V" receiver 60, 61 pads 62. The extension tube 70 can further be removed, as shown in FIG. 9, for storage or transportation. The extension tube is securable in position on the central tube 20 with a tube clamp 69 that operates with a cam 72 on a lever to allow for quick clamping and releasing of the extension tube 70.

In FIG. 2, the bottom of the tuba 14 is placed onto the arc sector or "V" receivers 60 and the tube of the tuba 14 is secured in clamp 80. FIGS. 5 to 7 show and describe the clamp in greater detail.

FIG. 5 shows a tubular clamp in an open configuration, FIG. 6 shows the tubular clamp 80 from FIG. 4 receiving a tube and FIG. 7 shows a perspective view of the tubular clamp 80 from FIGS. 4 and 5 grasping a tube. This clamp 80 can be placed on the extension tube 70 to grasp the tube 12 of a musical instrument. The riser tube 75 is held with elbow 73 in position on the instrument stand. The position of the tubular clamp on the stand is adjustable and secured with screw clamp 92.

The tubular clamp 80 has a first arc sector or "V" receiver 81 and a second arc sector or "V" receiver 82 that grasps at least partially around the tube 12 of a musical instrument. The first arc sector or "V" receiver 81 pivots on a pivot axis 83 while the second arc sector or "V" receiver 82 pivots on a pivot axis 84 that extends through the body 91 of the tubular clamp 80. The inside edge s 93 limits the amount that the arc sector or "V" receivers will open. Each arc sector or "V" receiver 81 and 82 is padded or cushioned 86 to both frictionally grip the instrument tube 12 and to prevent damage to the instrument tube 12. When the instrument tube is pushed into the tubular clap 80 the arc sector or "V" receivers 81 and 82 will pivot until holes 89 engage into pins 88 that will hold the arc sector or "V" receivers 81 and 82 in a closed orientation as shown in FIG. 7. When release 85 is pulled back 87 the pins 88 will be pulled out of retentions holes 89 whereby releasing the arc sector or "V" receivers 81 and 82 and spring 94 will pull 90 the arc sector or "V" receivers 81 and 82 open to release the tube 12.

FIG. 8 shows a top perspective view of the sousaphone stand that is shown in FIGS. 1-4. This orientation of the stand represents the orientation where a performer will place the sousaphone into the stand. Because of the weight and cost of a sousaphone performers must often support the weight of the instrument by placing the instrument on their legs as they rest on the stadium. Using this instrument stand, a performer can place the instrument stand in a stadium and adjust the height of legs 30, 31 and 40, 41 to accommodate the geometry of the stadium seat or bleacher. The performer will loosen the cam clamp 72 to raise or lower the extension tube 70 from the central tube 20 and then tighten the tube clamp. The performer will then rest the upper tube of the sousaphone in the pads 62 of the arc sector or "V" receivers 60 and 61 that exist on the ends of arms 63, 64 from head 21. The sousaphone will then naturally rotate onto pads 50 and 51 that can also be adjustable on legs 30 and 31 to cushion the sousaphone. It is contemplated that to assist in positioning the extension tube 70 that a spring, gas filled strut or other similar lifting mechanism are can be incorporated into the central tube 20 to assist a performer to extend the extension tube 70 out of the center tube 20 as shown and described in FIG. 10.

FIG. 9 shows the collapsed pieces of the sousaphone stand ready for transportation. In this figure the central tube 20 including the cam clamp 72, extension tube 70, head 21 and the padded arc sector or "V" receiver musical instrument supports are separated from the leg assemblies. The leg assemblies will include the first leg set 30, 31, sliders and foot pads 37. The leg assemblies also include the second leg set that are partially visible behind the first leg set 30, 31. The pads 50 and 51 are shown rotated against the pivoting sliders to minimize storage size. The slide collar 42 is shown removed from the central tube 20. While FIG. 9 shows the sousaphone stand, the tuba stand is disassembled in a similar manner.

Referring now to FIG. 10 that shows an exploded view of the extension mechanism 39. The extension/lift mechanism can be a variety of different mechanism. In FIG. 6 it is shown as a compression spring. In this figure the lift/extension mechanism is shown and described as a strut. The strut shown is a gas filled extension mechanism that naturally exists in an extended orientation. Pushing upon the two ends will compress the strut. Various different forces and extension lengths are available. When using the strut in the embodiments shown, the strut must be stopped med stroke at the length desired by the user. One contemplated embodiment of the clamping mechanism is shown and described in FIG. 12.

The strut 39 has end caps 57 and 55 that are installed with the tubes 34 and 26. A set screw or stops 51 and 58 retain the end caps 57 and 55 within the tubes 34 and 26. In one embodiment the end caps sit on the screws 51 and 58. In another embodiment the screws 51 and 58 bind the end caps 57 and 55 to prevent the inner tube 34 from being accidentally removed from the outer tube 26. A guide 59 exists in the middle of the strut 39 to reduce axial loading on the strut that could harm the seals of the strut 39. The extension mechanism can be either inserted into the inner tube 34 or in the outer tube 26. A securing means for securing a musical instrument is attached to the end of the upper tube 34. The instrument securing means allows a performer to install a musical instrument such as a drum or other musical instrument onto the stand. Various types of percussion musical instruments are shown in the figures. In this figure the securing means is a saddle where a musical instrument is placed vertically into the securing means.

FIG. 11 is an exploded view of the clamping mechanism 69. Referring briefly to FIGS. 1, 3, 4, 8 and 9 the clamping mechanism 69 is shown where the lower tube 26 and the upper tube 34 intersect. The clamping mechanism is an extrusion 260 with a central hole 262 where the lower portion of the clamping mechanism 69 is secured to the lower or outer diameter tube 26. The clamping mechanism is partially split into a lower portion that is secured to the lower tube 26 (not shown) and an upper section that can temporally hold the upper tube 34 (not shown) the split 263 separates these two section and allows separate flexibility for clamping the upper and lower parts of the clamping mechanism 269. A screw 264 closes the lower portion of the clamping mechanism 69 on the lower tube. A separate screw 265 passes through the upper portion of the clamping mechanism 69 where it is threaded into as shoulder bolt 267 with a threaded hole that the screw 265 threads into. A nut 268 retains the shoulder bolt 267 on a cam arm. The cam arm 266 has an eccentric hole that allows the upper portion of the clamping apparatus/griping means to close the gap 261 onto an upper tube to prevent extension of the upper tube 34 (not shown).

Figure 15:
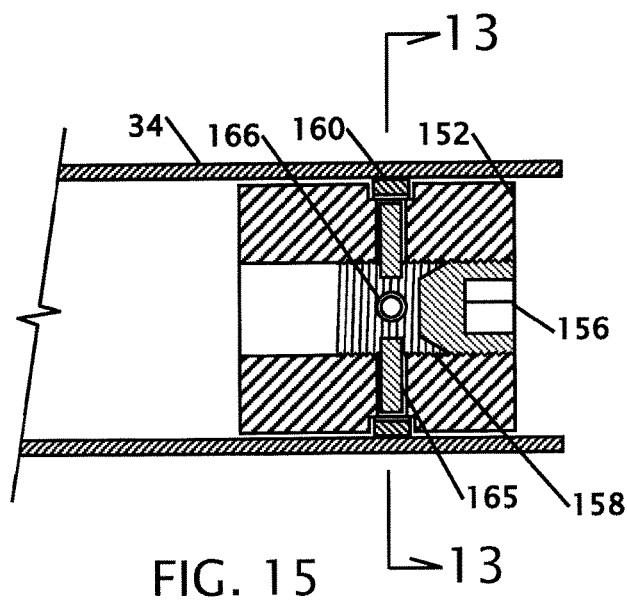
FIG. 15 shows a cross sectional view cut lengthwise through the travel stop.
Figure 16:
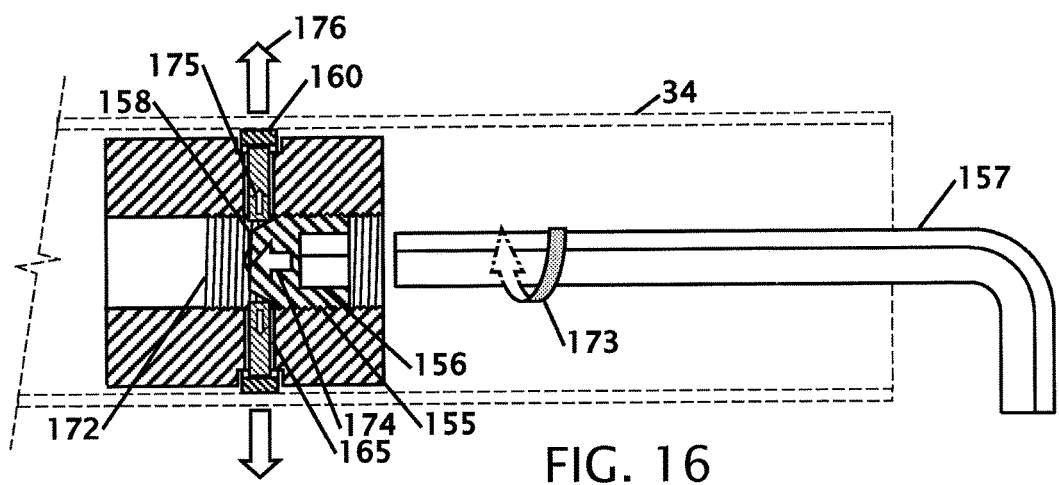
FIG. 16 shows a cross sectional view cut lengthwise through the travel stop showing the expansion of the split ring.

FIG. 12 shows a perspective view of the travel stop components. The travel stop is configured to fit within the center of a tube 34, but could also be placed within tube 20 or 70 as shown in FIGS. 1-4, 8, 9 or tube 34 shown in FIG. 10, or tubes 26, 70, or 76 in FIGS. 17-21. The travel stop shown in FIGS. 12-14 show a shoulder 153 that prevents insertion completely into the tube. In FIGS. 15 and 16 the shoulder is not present and allows the travel stop to be inserted completely into the tube. The shoulder 153 has a stopping ridge 152 with a step, but could be rounded or otherwise shaped to prevent the travel stop from sliding into the tube. The outer diameter of the shoulder 153 is preferably the same diameter as the outer diameter of the tube to create a smooth transition from the tube 34 to the end cap shoulder 153.

An elongated shank exists both above 151 and below 150 a split ring 160. The elongated shank 150/151 provides both a guide and a bearing surface for the travel stop. The split ring 160 is preferably located along the center of the elongated shank 150/151. The location of the split ring 160 must be placed sufficiently from the shoulder 152 to reduce the possibility of splitting the travel stop with the split ring 160 is expanded to grip the inside diameter of the tube 34. A split 161 in the split ring 160 allows the outside diameter to expand to grip the inside diameter 34 of the tube. Various materials are contemplated for the travel stop. In the preferred embodiment the travel stop is made from a strong but fairly light weight material such as aluminum, but other material are contemplated such as plastic. It is also contemplated that the travel stop can be manufactured from a heavier material to provide some initial weight. Some heavier materials that are contemplated include but are not limited to copper alloys, stainless steel and other non-toxic and or non-rusting materials. Still other materials that are contemplated are hard rubbers that will still maintain some mechanical structure but also will provide some flexibility if impacted.

The bottom of the travel stop is generally flat 154 with a clearance hole that allows the threaded set screw 155 to be inserted from either end. FIG. 13 shows a cross sectional view of the travel stop cut just above the split ring 160 cut through section 13-13 in FIG. 15. The split ring 160 exists within a recess 162 as shown in the sectional view in FIG. 12. The split 161 in the ring is obvious in this figure. The split is shown in an exaggerated opening to make it more visible. In the preferred embodiment the split 161 is perpendicular with the ring 160, but it is also contemplated that the split 161 can exist at an angle to reduce the possibility that the split will occupy the area over the expansion pins 165. The expansion pins 165 exist in holes 166. The holes 166 are sized to provide clearance for the pins 165 to freely slide. The holes 166 pass from the center of the cylinder 151 to the outside of the cylinder 151. A screw 155 with a tapered head pushes the pins 165 outward when the screw is turned into the travel stop. The shoulder 152 of the end plug is visible outside of the cylinder 151 and split ring 160.

FIG. 14 shows an end view of the adjustable travel stop showing the tool insert socket. This view is the socket 156 for insertion of a hex key is visible. A hex key is inserted into the socket 156 to move the screw 155 into and out of the end cap. Movement of the screw 155 pushes the pins 165 as shown in FIG. 16.

FIG. 15 shows a cross sectional view cut lengthwise through the adjustable travel stop. In this figure the screw 155 is backed away from the pins 165. The screw 155 is backed away from the pins to allow the end cap to be inserted into the end of the tube 34. To move the screw 155, a hex key is inserted into the socket 156, the end 154 of the end cap is held, and the hex key is turned to screw or unscrew the screw 155. The end cap is inserted until the end of the tube 34 and into position. An installer can partially expand the split ring 160 to create a frictional or interference fit of the travel stop within the tube 34. This frictional fit allows an installer to push/slide the travel stop into position within the tube 34 before locking the travel stop in position at an intermediate position between the two ends of the tube 34.

When the screw 155 is turned into the end cap the tapered end 158 of the screw 155 pushes into the pins 165 to push the pins, through the clearance holes 166, against the split ring 160 to make the split ring grip the inside diameter 134 of the tube 34. The taper 158 of the screw 155 pushing against the pins and then the split ring is shown in more detail with FIG. 16.

FIG. 16 shows a cross sectional view cut lengthwise through the travel stop showing the expansion of the split ring 160. The travel stop is shown deep within the tube 34 and requires an elongated Hex key to secure and remove the travel stop within the tube 34. The Hex key and or the set screw can be magnetized to make removal of the travel stop insertion easier. This figure has a hex key 157 shown where it can engage into the hex socket 156 of the set screw 155. As the screw 155 is turned clockwise 173 the screw moves into 174 the end cap and the tapered 158 end or nose of the screw 155 pushes pins 165 out 175 through the clearance holes 165 where the pins push the split ring 160 out 176.

Figure 17:
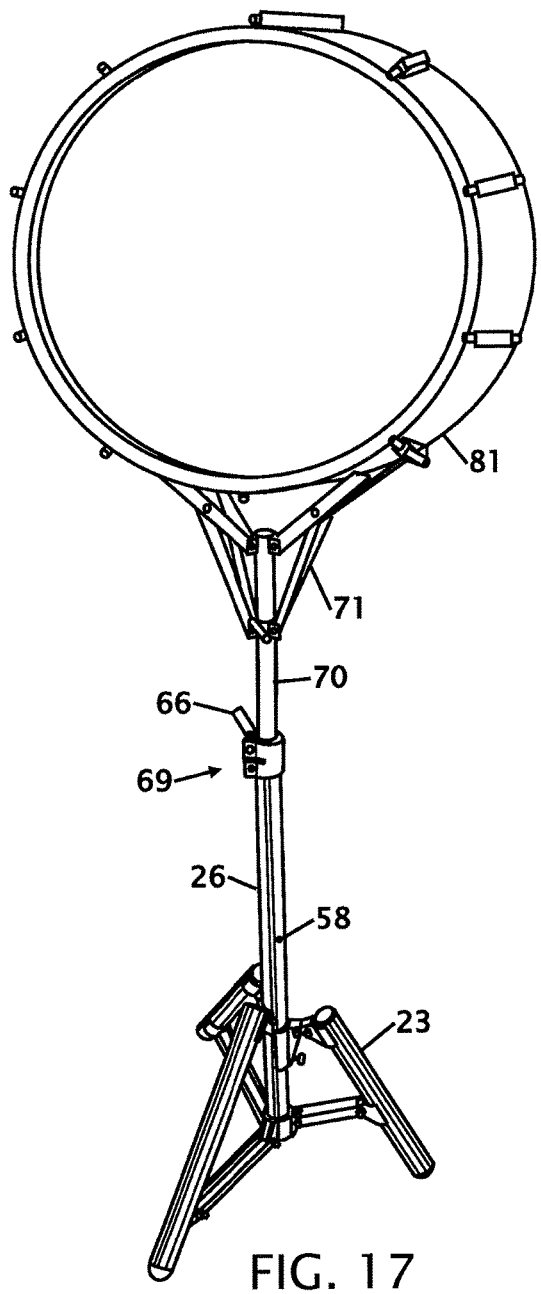
FIG. 17 is an isometric view of the extendable tripod stand with a vertically mounted bass drum.

In FIG. 17 the extendable stand is mounted with a vertically mounted on a bass drum. In each of the configurations the drum can be quickly removed from a performer's body mounted carrier and installed onto the adjustable stand. In all of these configurations the base or legs 23 extend from the lower central tube 26. The extension mechanism exists inside one of the tubes where it is secured or located with screws 58 and or 51. In all of these figures the upper tube 34 is shown partially pushed out of the lower tube 26. The amount of extension of the upper tube 34 out of the lower tube 26 is determined by the performer preference and an infinite number of different heights are adjustable. The force and extension length of the extension mechanism is variable based upon the type and weight of instrument that is being supported. In the preferred embodiment the force of the extension mechanism is selected to allow for minimal force by the user to raise or lower the musical instrument 79 and the weight of the musical instrument is sufficient to approximately equal the force from the extension mechanism.

The strut can be fixed to the stand, or can be changeable. The clamping apparatus/griping means 69 grips the upper tube to prevent undesirable movement of the upper tube while a performer is performing. The location of the tube 70 is quickly adjustable with the eccentric cam arm 66. In this figure, a series of drum supports 71 hold the vertically mounted drum 81.

The inventor of this disclosure has also been awarded U.S. Pat. Nos. 7,438,266, 7,588,228, 7,703,725 and 7,718,878 that disclose tripod type stands. It is distinguished over the prior art in general, and these patents in particular by an adjustable musical instrument stand with independently adjustable legs 23 which comprise s a longitudinal extensible upright portion of tele scoping tubular members, a plurality of collar members 69 slidably mounted on the upright portion of 26 which are longitudinally adjustable relative to one another and to the upright portion of 26 for selective positioning. The lift mechanism further creates additional improvement and user performance feature s that were not obvious and are novel over the inventors prior patents.

Figure 18:
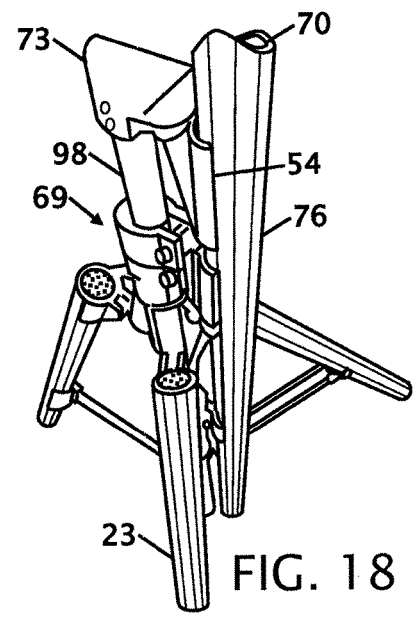
FIG. 18 shows a top perspective view of a compound lift mechanism.
Figure 19:
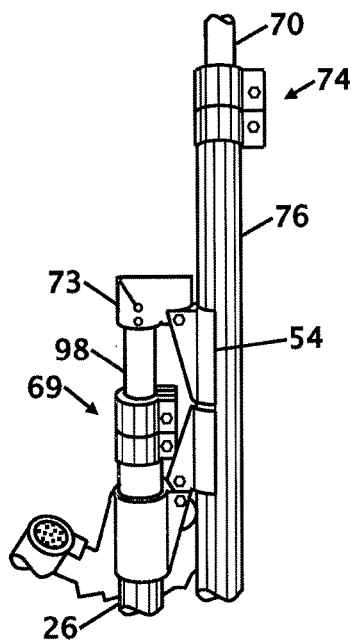
FIG. 19 shows a detailed view of a compound lift mechanism.
Figure 20:
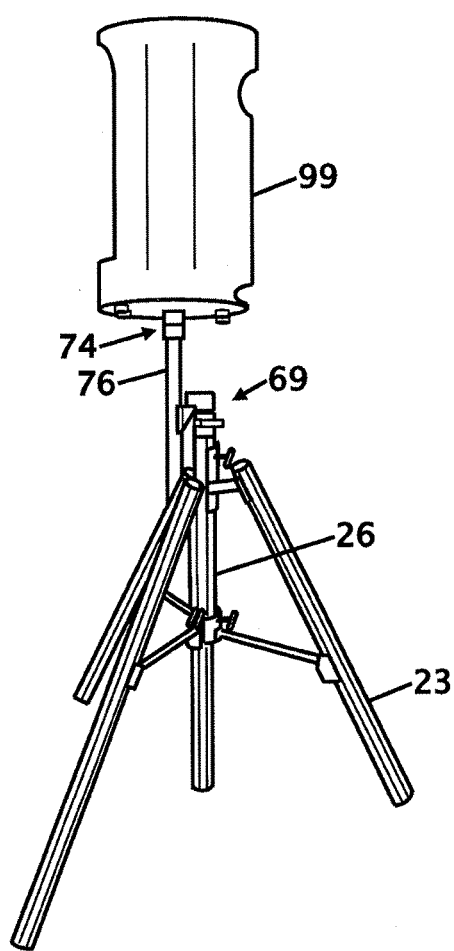
FIG. 20 shows a perspective view of the compound lift in a retracted condition with a top mounted speaker.
Figure 21:
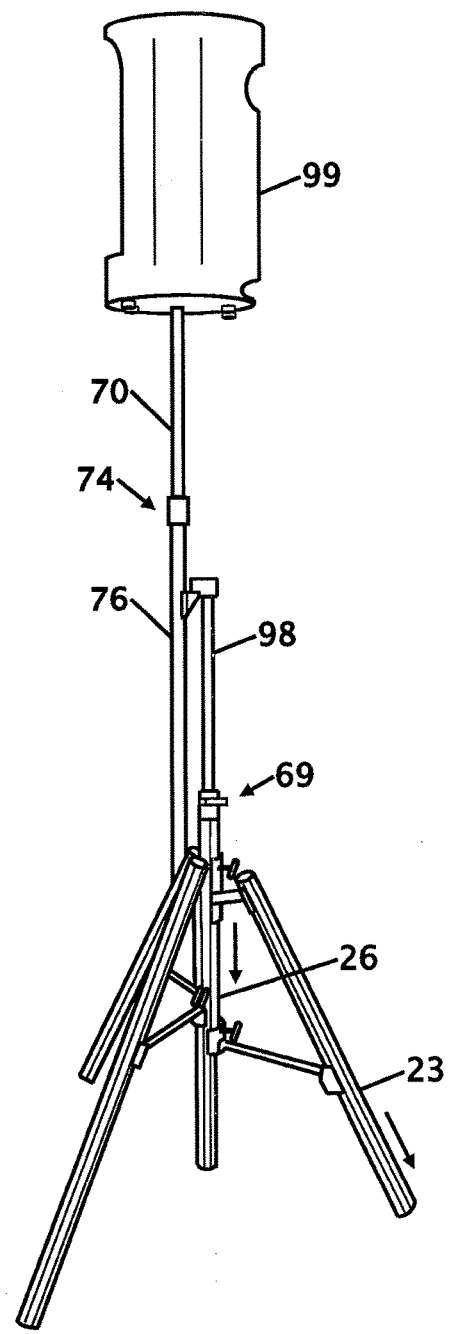
FIG. 21 shows a perspective view of the compound lift in an extended condition with a top mounted speaker.

FIG. 18 shows a top perspective view of a compound lift mechanism, FIG. 19 shows a detailed view of a compound lift mechanism, FIG. 20 shows a perspective view of the compound lift in a retracted condition with a top mounted speaker, and FIG. 21 shows a perspective view of the compound lift in an extended condition with a top mounted speaker. In FIGS. 18 and 19 a second or compound lift member 76 is mounted aside the lower central tube 26. The parallel structure of the lower central tube with the compound lift member 76 provides additional stability when the parallel members are clamped. Releasing the lower clamping mechanism 69 allows the internal extension/lift mechanism rod 98, as shown and described in FIG. 10, pushes upon connecting elbow 73 to extend as the guides 54 slide along the outrigger lift tube 76. A second extension/lift mechanism 70 is exists within the outrigger lift tube 76 to provide a second lift to further extend the lift height of the stand by releasing upper clamping mechanism 74.

In FIG. 20, a speaker 99 is mounted to the top of the stand and shown in a lowered condition. In FIG. 16 one of the legs 23 is shown slightly displaced to show an adjustment for placement of the stand on an uneven surface. FIG. 16 also shows the speaker more fully elevated with both the first stage extension tube 98 and the second stage extension tube 70 released and extended. Once the tubes are extended to the desired extension, clamps 69 and 74 are secured.

The enabled features described in detail above are considered novel over the prior art of record and are considered critical to the operation of at least one aspect of the invention and to the achievement of the objectives of the invention. The words used in this specification to describe the exemplary embodiments are to be understood not only in the sense of their commonly defined meanings, but also to include any special definition with regard to structure, material or acts that would be understood by one of ordinary skilled in the art to apply in the context of the entire disclosure.

The definitions of the words or drawing elements described herein are meant to include not only the combination of elements which are literally set forth, but all equivalent structures, materials or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim without departing from the scope of the invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

What is claimed is:

1. A lift mechanism for a tube, the lift mechanism comprising:
   an adjustable travel stop having opposing surfaces defining lateral ends of the travel stop, the travel stop configured to be repositioned along a length of said tube such that the opposing surfaces are interior to the tube;
   an extension mechanism configured to extend from said tube and pushing against said adjustable travel stop so as to thereby provide mechanical lift assistance,
   wherein an extension limit of said lift mechanism is set by a position of said adjustable travel stop within said tube.

2. The lift mechanism for a tube according to claim 1, further comprising a supporting base for said tube, wherein said supporting base comprises at least one leg that is independently adjustable to slide and secure on said tube.

3. The lift mechanism for a tube according to claim 1, wherein said adjustable travel stop comprises: a retention mechanism having a split ring that is expandable to frictionally prevent motion of said adjustable travel stop within said tube.

4. The lift mechanism for a tube according to claim 1, wherein said split ring is configured to expand outwardly to press against an inside diameter of said tube.

5. The lift mechanism for a tube according to claim 4, wherein said expansion is actuated in response to a screw or bolt pushing a plurality of pins or balls outwardly against an inside diameter of the split ring.

6. The lift mechanism for a tube according to claim 1, further comprising a supporting base for said tube, wherein said supporting base includes at least three legs secured on said tube.

7. The lift mechanism for a tube according to claim 1, the lift mechanism further comprising: at least two arms that extend from a central head to engage a musical instrument.

8. The lift mechanism for a tube according to claim 1, wherein said extension mechanism comprises: a spring or a gas filled strut.

9. The lift mechanism for a tube according to claim 1, wherein said tube supports a musical instrument or a speaker.

\* \* \* \* \*